United States Patent
Valsecchi et al.

(10) Patent No.: US 10,270,644 B1
(45) Date of Patent: Apr. 23, 2019

(54) FRAMEWORK FOR INTELLIGENT AUTOMATED OPERATIONS FOR NETWORK, SERVICE AND CUSTOMER EXPERIENCE MANAGEMENT

(71) Applicant: Accenture Global Solutions Limited, Dublin (IE)

(72) Inventors: Luca Valsecchi, Antibes (FR); Luca Moreschini, Rome (IT); Vincenzo Forciniti, Milan (IT)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 15/982,894

(22) Filed: May 17, 2018

(51) Int. Cl.
*H04L 12/24* (2006.01)
*G06N 99/00* (2019.01)
*G06N 5/04* (2006.01)

(52) U.S. Cl.
CPC ........... *H04L 41/0609* (2013.01); *G06N 5/04* (2013.01); *G06N 99/005* (2013.01); *H04L 41/069* (2013.01); *H04L 41/0654* (2013.01); *H04L 41/22* (2013.01); *H04L 41/5074* (2013.01)

(58) Field of Classification Search
CPC ............. H04L 41/0609; H04L 41/0654; H04L 41/069; H04L 41/22; H04L 41/5074; G06N 5/04; G06N 99/005
See application file for complete search history.

(56) References Cited

U.S. PATENT DOCUMENTS

| | | | | | |
|---|---|---|---|---|---|
| 5,377,196 | A | * | 12/1994 | Godlew | H04L 41/16 706/917 |
| 6,513,025 | B1 | * | 1/2003 | Rosen | G06N 5/025 706/12 |
| 6,560,648 | B1 | * | 5/2003 | Dunn | H04L 41/12 709/223 |
| 7,225,250 | B1 | * | 5/2007 | Harrop | H04L 41/0681 709/223 |
| 9,350,601 | B2 | * | 5/2016 | Jain | H04L 41/0654 |
| 9,413,454 | B1 | * | 8/2016 | Reddy Bovilla | H04B 10/03 |
| 9,594,621 | B1 | * | 3/2017 | Navilappa | G06F 11/0793 |
| 2002/0112072 | A1 | * | 8/2002 | Jain | H04L 45/00 709/239 |
| 2002/0133757 | A1 | * | 9/2002 | Bertram | G06F 11/3447 714/47.2 |

(Continued)

OTHER PUBLICATIONS

Iain Morris, "Finland's Elisa Is Selling Its Automation Smarts to Other Telcos" https://www.lightreading.com/automation/finlands-elisa-is-selling-its-automation-smarts-to-other-telcos/d/d-id/741298, Mar. 12, 2018, 6 pages.

(Continued)

*Primary Examiner* — Jerry B Dennison
(74) *Attorney, Agent, or Firm* — Harrity & Harrity, LLP

(57) ABSTRACT

A device may receive an alarm from a network and determine whether to process the alarm using a robotic process automation (RPA) engine or a machine learning automation (MLA) engine. Based on the determination, the device may selectively cause the alarm to be processed by the RPA engine or the MLA engine. The device may receive data associated with a network performance indicator and may provide the data to the MLA engine. The MLA engine may use a machine learning model to assign a score to the data and may determine whether to generate a trouble ticket based on the score.

20 Claims, 10 Drawing Sheets

(56) References Cited

U.S. PATENT DOCUMENTS

| | | | | |
|---|---|---|---|---|
| 2007/0169162 | A1* | 7/2007 | Kola | H04L 12/2801 |
| | | | | 725/117 |
| 2008/0267076 | A1* | 10/2008 | Laperi | H04M 11/062 |
| | | | | 370/242 |
| 2011/0086634 | A1* | 4/2011 | Rahman | H04W 24/08 |
| | | | | 455/423 |
| 2012/0281523 | A1* | 11/2012 | Huber | H04L 41/0663 |
| | | | | 370/217 |
| 2014/0093231 | A1* | 4/2014 | Fisher | H04B 10/03 |
| | | | | 398/2 |
| 2016/0203036 | A1* | 7/2016 | Mezic | G06F 11/079 |
| | | | | 714/819 |
| 2017/0054641 | A1* | 2/2017 | Anerousis | H04W 24/08 |
| 2017/0161640 | A1* | 6/2017 | Shamir | G06N 99/005 |
| 2017/0207951 | A1* | 7/2017 | Lehman | H04L 41/0672 |
| 2017/0339007 | A1* | 11/2017 | Wang | H04L 41/00 |
| 2018/0123901 | A1* | 5/2018 | Yermakov | G06N 99/005 |
| 2018/0137411 | A1* | 5/2018 | Jayaraman | G06N 3/0445 |
| 2018/0137415 | A1* | 5/2018 | Steinberg | G06F 15/18 |
| 2018/0174067 | A1* | 6/2018 | Spiro | G06F 17/5009 |

OTHER PUBLICATIONS

Mogsoft, "The Next Generation Platform for IT Incident Management", https://www.moogsoft.com/, Dec. 21, 2017, 10 pages.

\* cited by examiner

FRAMEWORK FOR INTELLIGENT AUTOMATED OPERATIONS FOR NETWORK, SERVICE AND CUSTOMER EXPERIENCE MANAGEMENT

BACKGROUND

Network, service, and/or customer experience management may include the use of a device and/or system that monitors a computer network for slow or failing components, degradations in services, and/or customer experiences, and that provides a notification in case of network outages, services outages, or other network problems. The notification may include the sending of an alarm (e.g., via email, text, or the like) to a network administrator of the network. Network, service, and/or customer experience management may also include monitoring performance indicators associated with performance of the network, service indicators associated with a service, customer experience indicators associated with customer experience, and/or the like, such as response time, availability, uptime, consistency metrics, reliability metrics, and/or the like.

SUMMARY

According to some possible implementations, a device may include one or more memories; and one or more processors, communicatively coupled to the one or more memories, to receive an alarm from a network, determine whether to process the alarm using a robotic process automation (RPA) engine or a machine learning automation (MLA) engine, and selectively cause the alarm to be processed by the RPA engine or the MLA engine. The RPA engine may perform a network diagnostic test to confirm that the alarm is associated with a fault in the network, determine whether the RPA engine is capable of performing one or more first recovery actions to process the alarm based on determining that the alarm is associated with the fault in the network, and perform the one or more first recovery actions based on determining that the RPA engine is capable of performing the one or more first recovery actions. The MLA engine may use a machine learning model to assign a score to the alarm, determine whether to process the alarm based on the score, identify one or more second recovery actions based on determining to process the alarm, generate a recommendation to perform the one or more second recovery actions, and output the recommendation.

According to some possible implementations, a non-transitory computer-readable medium may store one or more instructions that, when executed by one or more processors, cause the one or more processors to receive an alarm from a network, determine whether to process the alarm using a RPA engine or a MLA engine, and selectively cause the alarm to be processed by the RPA engine or the MLA engine. The RPA engine may perform a network diagnostic test to confirm that the alarm is associated with a fault in the network, determine whether the RPA engine is capable of performing one or more first recovery actions to process the alarm based on determining that the alarm is associated with the fault in the network, generate a first recommendation to perform the one or more first recovery actions based on determining that the RPA engine is not capable of performing the one or more first recovery actions, and output the first recommendation. The MLA engine may use a machine learning model to assign a score to the alarm based on historical data associated with the alarm, determine whether to process the alarm based on the score, identify one or more second recovery actions based on determining to process the alarm, generate a second recommendation to perform the one or more second recovery actions, and output the second recommendation.

According to some possible implementations, a method may include receiving, at a device, data associated with a network performance indicator, and providing the data associated with the network performance indicator to a MLA engine. The method may include using a machine learning model to generate a score for the data associated with the network performance indicator. The score may define a probability of a fault, associated with the network performance indicator, occurring in the network. The method may include determining whether to generate a trouble ticket based on the score. The method may include identifying, based on determining to generate the trouble ticket, one or more recovery actions to prevent the fault from occurring in the network. The method may include generating the trouble ticket and outputting the trouble ticket. The trouble ticket may include a description of the one or more recovery actions.

DETAILED DESCRIPTION

Figure 1A:
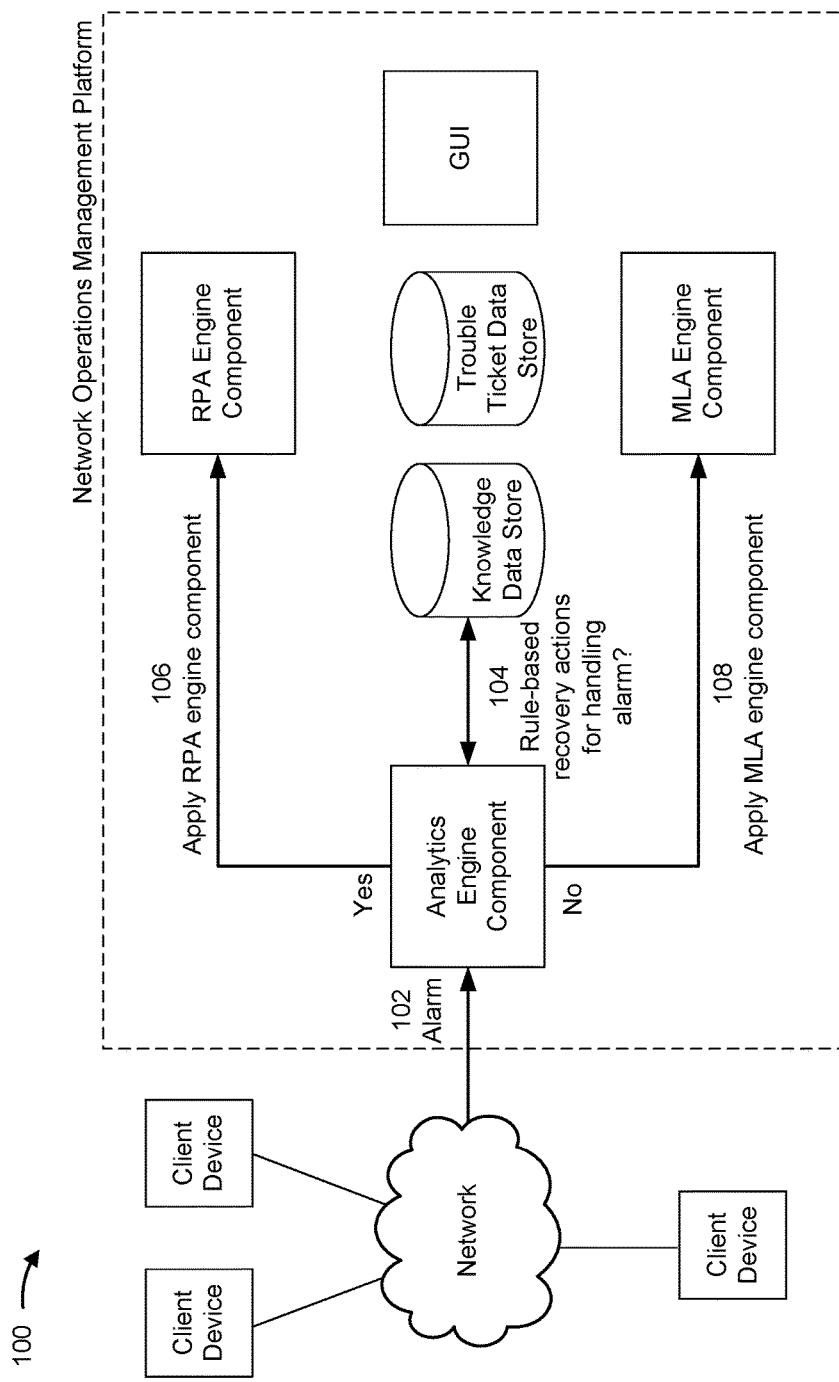
FIGS. 1A-1F are diagrams of an example implementation described herein.

The following detailed description of example implementations refers to the accompanying drawings. The same reference numbers in different drawings may identify the same or similar elements.

In a network operations center, network operations managers may interact with various hardware and software systems to monitor and manage a network. The systems may be monitoring alarms from the network and/or performance indicators associated with the network. The network operations managers, using the systems, may perform various actions, such as generating trouble tickets, performing recovery actions to process alarms, scheduling network maintenance, and/or the like.

As more and more devices are connected to a network, and more and more services are offered using the network, it becomes less feasible to maintain reliability and availability of the network through manual network monitoring and/or management. For example, as network activity increases, network operations managers may not be able to handle the corresponding increase in the volume of alarms. As a result, alarms may take longer to process, which in turn may result in service outages, increased network downtime, inability to meet service-level agreements, and/or the like.

Some implementations described herein provide a network operations management platform capable of processing alarms and/or performance indicators using various levels of automation. In this way, the network operations management platform may receive an alarm from a network, and process the alarm using a RPA engine or a MLA engine.

The RPA engine may be capable of automatically performing rule-based recovery actions for an alarm without human intervention. In this way, the RPA engine can reduce the amount of time it takes to process alarms, which allows for a greater volume of alarms to be processed in a period of time, which in turn increases network availability and reliability.

If an alarm is not associated one or more rule-based recovery actions, the MLA engine may use a machine learning model to assign a score to the alarm and determine whether to process the alarm based on the score. In this way, the MLA engine can preempt the occurrence of alarms and/or the worsening of network performance by proactively opening trouble tickets and attempting recovery actions. Moreover, the MLA engine may reduce network maintenance costs by ensuring costly repairs are not dispatched for alarms with a low score, which in some instances may be an indicator of a false positive.

In this way, several different stages of processing alarms, monitoring performance indicators, preventing faults in networks, and generating trouble tickets are automated, which may remove human subjectivity and waste from the process, and which may improve speed and efficiency of the processes and conserve computing resources (e.g., processor resources, memory resources, and/or the like). Furthermore, implementations described herein use rigorous, computerized processes to perform tasks or roles that were not previously performed or were previously performed using subjective human intuition or input. For example, currently human operators decide when to generate trouble tickets for degradations in network performance indicators based on past knowledge and experiences, which results in trouble tickets being generated unnecessarily and/or trouble tickets being generated too late to prevent a fault from occurring in a network. Finally, automating the processes for processing alarms, monitoring performance indicators, preventing faults in networks, and generating trouble tickets conserves computing resources (e.g., processor resources, memory resources, and/or the like) that would otherwise be wasted attempting to accommodate faults in a network by rerouting traffic through the network, readdressing network entities, and/or the like.

FIGS. 1A-1F are diagrams of an example implementation 100 described herein. As shown in FIGS. 1A-1F, example implementation 100 may include one or more client devices, a network, and a network operations management platform. In some implementations, the network operations management platform, as well as one or more client devices, may be communicatively connected to the network. In some implementations, the network operations management platform may be communicatively connected to the one or more client devices through the network.

The one or more client devices may include a mobile phone, a computer (e.g., a tablet computer, a laptop computer, desktop computer, or a handheld computer), a wearable communications device, and/or the like. In some implementations, the one or more client devices may include a customer-premises equipment (CPE) device. A CPE may include network equipment connected to a network operator's network and located at a premises of a user. A CPE may be either network operator provided (i.e., the network operator may own the equipment and provide the equipment to the user) or user-provided (i.e., the user may own the equipment). Examples of CPEs include a router, a network switch, a broadband modem (e.g., cable modem, digital subscriber line modem, mobile broadband modem, etc.), a residential gateway, a wireless access point, a hub, a set-top box, and/or the like.

The network may include at least one wired and/or wireless network, such as a cellular network, a telephone network, a private network, the Internet, and/or the like.

The network operations management platform may perform various functions pertaining to the network, such as network monitoring functions, network management functions, and/or the like, as described in more detail below. In some implementations, the network monitoring functions may include functions associated with monitoring performance (e.g., response time, availability, uptime, etc.) of the network, detecting alarms associated with the network, and/or the like. Any reference to the network is intended to equally apply to any one or more devices operating in the network.

Monitoring performance of the network may include monitoring one or more performance indicators that measure various aspects associated with the performance of the network. For example, the one or more performance indicators may include network latency, bandwidth usage of one or more client devices connected to the network, upload and/or download speed for one or more client devices connected to the network, throughput of the network, a quantity of active client devices connected to the network, packet loss in the network (i.e., an amount of packets traveling through the network that fail to arrive at an intended destination), an amount of jitter in the network (i.e., an amount that time-varying signals being transmitted through the network deviate from a reference clock signal in the network), a service indicator associated with a service offered in the network, a customer experience indicator associated with a customer experience in the network, and/or the like. The network operations management platform may monitor the one or more performance indicators by receiving data associated with the one or more performance indicators, performing diagnostic tests associated with the one or more performance indicators, and/or the like. As an example, the network operations management platform may be monitoring jitter in a network, and may perform a ping test in the network and receive data from the network (e.g., response times) based on the ping test. The network operations management platform may use the variation of response times from the ping test to monitor the jitter in the network.

Detecting alarms associated with the network may include configuring alarms, receiving alarms from the network, and/or the like. An alarm may be an indication that an event has occurred in the network and/or a client device connected to the network. The network operations management platform may configure alarms for various types of events. For example, an event may correspond to a fault in the network, such as a cable modem offline event (i.e., a cable modem connected to the network has gone offline), a domain name system (DNS) server offline event, and/or the like. In some cases, an event may correspond to a degradation in a performance indicator of the network. For example, the network operations management platform may set up a threshold for a performance indicator, and an alarm may trigger when the performance indicator satisfies the threshold. As an example, the network operations management platform may set a response time threshold for a client device connected to the network, and may trigger an alarm when the response time of the client device satisfies the response time threshold.

The network management functions may include performing management tasks based on the various network monitoring functions described above. For example, the network management functions may include processing alarms, mitigating degradations in performance indicators, provisioning, maintaining quality of service in the network, and/or the like.

Processing alarms may include performing one or more recovery actions to process the alarms, generating a recommendation to perform one or more recovery actions to process the alarms and including the recommendation in a trouble ticket, performing maintenance on the network, and/or the like. Mitigating degradations in performance indicators associated with the network may include determining whether to perform one or more recovery actions, performing the one or more recovery actions, determining whether to generate a recommendation to perform the one or more recovery actions, generating the recommendation and including the recommendation in a trouble ticket, and/or the like. Provisioning may include provisioning a web server, provisioning a domain name system server, provisioning a cloud server, provisioning services in the network, and/or the like. Maintaining quality of service in the network may include scheduling, queuing, prioritizing network resources, and/or the like.

As shown in FIGS. 1A-1F, the network operations management platform may include a knowledge data store, a trouble ticket data store, an analytics engine component, a RPA engine component, a MLA engine component, and a GUI component.

The knowledge data store and trouble ticket data store may be implemented in various types of data stores, such as a database, a distributed database, a file system, one or more electronic files, a table, and/or the like. In some implementations, the knowledge data store and the trouble ticket data store may be included a same memory device or collection of memory devices. In some implementations, the knowledge data store and the trouble ticket data store may be included a separate memory devices or collections of memory devices. In some implementations, the knowledge data store and/or the trouble ticket data store may be included as part of the network management platform. In some implementations, the knowledge data store and/or the trouble ticket data store may be located remote from the network management platform.

The knowledge data store may include information associated with alarms, information associated performance indicators associated with the network, information associated with recovery actions associated with the alarms and/or the performance indicators, user feedback, and/or the like. The trouble ticket data store may track trouble tickets associated with the network and/or the client devices connected to the network. In some implementations, the trouble ticket data store may store a status of the trouble tickets tracked therein. For example, the status of a trouble ticket may include information associated with the trouble ticket, such as information for a time that the trouble ticket was generated, information for whether the trouble ticket is open, in process and/or closed, information for an amount of users affected by the trouble ticket, information for an expected time remaining to process the trouble ticket, and/or the like.

The analytics engine component may receive information from the network and/or the client devices connected to the network. For example, the analytics engine component may receive one or more alarms, data associated with one or more performance indicators associated with the network, and/or the like. The analytics engine component may analyze the data to determine whether to provide the one or more alarms and/or data associated with the one or more performance indicators to the RPA engine component or the MLA engine component, as described below.

The RPA engine may be capable of automatically processing an alarm that is associated with one or more rule-based recovery actions that are known to be successful in processing the alarm. A rule-based recovery action may be a recovery action that has a well-defined action that can be applied by the RPA engine component. The one or more rule-based recovery actions may define a logical flow of rule-based recovery actions that the RPA engine component can apply to the alarm (e.g., Apply Recovery Action 1, if Result A occurs, apply Recovery Action 2, etc.). As an example, an alarm may be associated with a cable modem offline event. In this example, the one or more rule-based recovery actions for processing the alarm may include a first recovery action to send a reboot signal to the cable modem, a second recovery action to ping the cable modem to determine that the cable modem is now online, and/or the like.

The MLA engine component may be capable of using machine learning models to determine whether trouble tickets should be opened for alarms, automatically attempting recovery actions to process alarms, automatically recommending recovery actions for processing alarms, automatically generating trouble tickets for alarms, automatically dispatching trouble tickets, and/or the like. In some implementations, the MLA engine component may be capable of using machine learning models to determine whether trouble tickets should be opened for a performance indicator associated with the network, automatically attempting recovery actions for the performance indicator, automatically recommending recovery actions for the performance indicator, automatically generating a trouble ticket for the performance indicator, automatically dispatching the trouble ticket, and/or the like.

Turning now to FIG. 1A, the network operations management platform may monitor the network and/or the client devices connected to the network. As shown by reference number 102, the analytics engine component may receive an alarm from the network. The analytics engine component may determine whether to process the alarm using the RPA engine component or the MLA engine component. As explained above, the RPA engine component may be capable of processing alarms associated with one or more rule-based recovery actions. Accordingly, the analytics engine component may determine to process the alarm using the RPA engine component when the alarm is associated with one or more rule-based recovery actions to process the alarm. If there are no rule-based recovery actions associated with the alarm, the analytics engine component may determine to process the alarm using the MLA engine component.

As further shown in FIG. 1A, by reference number 104, the analytics engine component may determine whether the alarm received from the network is associated with one or more rule-based recovery actions to process the alarm. To do so, the analytics engine component may search the knowledge data store to see if the alarm has been assigned one or more rule-based recovery actions. In some implementations, the knowledge data store may include a description of one or more alarms and, if an alarm is associated with one or more recovery actions, a description of the one or more recovery actions.

In some implementations, the analytics engine component may identify the alarm in the knowledge data store, and may determine whether the alarm has an associated one or more recovery actions. If so, the analytics engine component may determine whether the associated one or more recovery actions are one or more rule-based recovery actions that are known to successfully process the alarm (e.g., prior alarm data, such as user feedback, has confirmed that the one or more rule-based recovery actions are successful in processing the alarm). For example, the alarm may have metadata associated with the alarm in the knowledge data store, and the analytics engine component may reference the metadata to make the determination. The metadata may list any recovery actions associated with the alarm, and may indicate whether the associated recovery actions are rule-based.

As further shown in FIG. 1A, by reference number 106, if the analytics engine component determines that there are one or more rule-based recovery actions, associated with the alarm, in the knowledge data store, the analytics engine component may selectively cause the alarm to be processed by the RPA engine component. As shown by reference number 108, if the analytics engine component determines that there are no recovery rules associated with the alarm, that there are one or more recovery rules associated with the alarm that are not rule-based recovery rules, and/or that there are a plurality of different recovery rules (e.g., one or more first recovery rules and one or more second recovery rules, etc.) that may be tried to process the alarm, the analytics engine component may selectively cause the alarm to be processed by the MLA engine component.

Figure 1B:
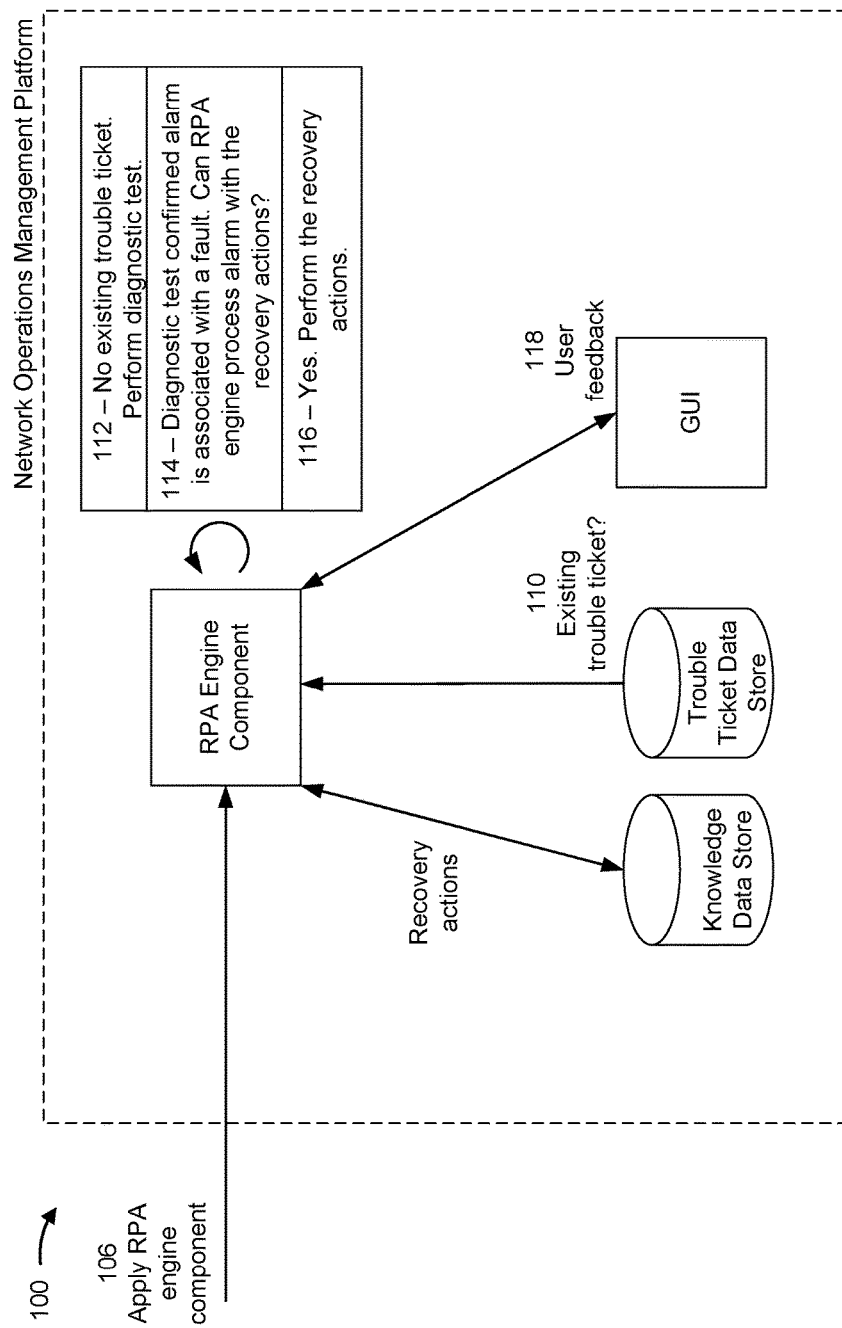

As shown in FIG. 1B, and as explained above with reference to reference number 106, if the analytics engine component selectively causes the alarm to be processed by the RPA engine component, the analytics engine component may provide the alarm to the RPA engine component. As shown by reference number 110, the RPA engine component may determine whether there is an existing trouble ticket already for the alarm in the trouble ticket data store. For example, the RPA engine component may search the trouble ticket data store to identify a trouble ticket associated with the alarm (e.g., the trouble ticket includes a description corresponding to the alarm). In some implementations, if the RPA engine component determines, based on information in the trouble ticket data store, that there is already a trouble ticket associated with the alarm, the RPA engine component may determine to not open a trouble ticket for the alarm.

As further shown in FIG. 1B, and by reference number 112, if the RPA engine component determines that there is no existing trouble ticket associated with the alarm, the RPA engine may perform a diagnostic test to confirm that the alarm is associated with a fault in the network, such as any of the faults described herein. For example, the diagnostic test may include a network bandwidth test, a network latency test, a packet loss test, a ping test, a traceroute test, or a domain name service lookup test, and/or the like. In some implementations, to perform the diagnostic test, the RPA engine component may invoke an API, and may perform the diagnostic test using a diagnostic tool, such as a command prompt, a batch file, a software-based network diagnostics platform, and/or the like, via the invoked API.

In some implementations, the RPA engine component may confirm that the alarm is associated with the fault in the network if the diagnostic test results are indicative of the fault in the network. For example, if the alarm is associated with a cable modem offline event, the RPA engine component may confirm that the cable modem is offline by running a ping test for the diagnostic test (e.g., the RPA engine component may send one or more data packets to the cable modem and determine if the cable modem receives the data packets), and confirming that RPA engine component receives no response from the ping test (e.g., the RPA engine component receives no confirmation from the cable modem that the one or more data packets were received).

As further shown in FIG. 1B, and by reference number 114, if the RPA engine component confirms that the alarm is associated with the fault in the network, the RPA engine component may determine whether the RPA engine component is capable of performing the one or more rule-based recovery actions associated with the alarm to process the alarm. The RPA engine component may be capable of performing the one or more rule-based recovery actions if the RPA engine component can perform the one or more rule-based recovery actions automatically without human intervention.

As further shown in FIG. 1B, and by reference number 116, if the RPA engine component determines that the RPA engine component is capable of performing the one or more rule-based recovery actions, the RPA engine component may perform the one or more rule-based recovery actions to process the alarm. The RPA engine component may perform another diagnostic test to confirm that performing the one or more rule-based recovery actions successfully processed the alarm. For example, in a case where the cable modem was determined to be offline (e.g., and confirmed by running the ping test described above), the RPA engine may run a same or similar ping test to confirm that the cable modem now receives the data packets. In some implementations, after confirming the alarm was successfully processed, the RPA engine component may open a trouble ticket for the alarm, populate the trouble ticket with a description of the one or more rule-based recovery actions performed by the RPA engine, indicate in the trouble ticket that the alarm was successfully processed (e.g., the diagnostic test confirmed that the alarm was successfully processed), mark the trouble ticket as closed, and store the trouble ticket in the trouble ticket data store.

In some implementations, while the RPA engine component is performing the functions described with reference to reference numbers 110-116, the RPA engine component may generate instructions to display the actions taken by the RPA engine component on a graphical user interface (GUI) of the network operations management platform (e.g., via a desktop monitor, tablet display, mobile phone display, television display, and/or the like). In this case, the GUI may allow a user (e.g., a network operations manager) using the network operations management platform to view the actions being performed by the RPA engine component while the RPA engine component is performing the actions (e.g., in real-time).

As further shown in FIG. 1B, and by reference number 118, the user may provide feedback on the actions performed by the RPA engine component. For example, the feedback may include feedback confirming that the one or more rule-based recovery actions successfully processed the alarm, feedback in the form of modifications to the one or more rule-based recovery actions (e.g., the user may know of a more efficient way to carry out the one or more rule-based recovery actions, and the user may modify the one or more rule-based recovery actions accordingly), and/or the like. In some implementations, the RPA engine component may receive the feedback from the user via user input (e.g., using an input device, such as a touch screen, mouse, keyboard, and/or the like), and may store the feedback in the knowledge data store. In this way, recovery rules for alarms may be continually refined so that the RPA engine component can process rules faster while using fewer processing and/or memory resources of the network operations management platform.

In some implementations, while the RPA engine component is performing the one or more rule-based recovery actions, the RPA engine component may provide a request, to the user through the GUI, for input from the user. As an example, the RPA engine component may be performing one or more rule-based recovery actions, where one of the one or more rule-based recovery actions includes sending a reboot signal to a cable modem at a customer premises. Before sending the reboot signal to the cable modem, the one or more rule-based recovery actions may specify that the RPA engine component is to request the user to confirm that the RPA engine component should send the reboot signal. This is to ensure that if the customer is on-premises using the cable modem, the RPA engine component does not interrupt the use of the cable modem while the customer is using the cable modem. Thereafter, the user can confirm that the customer is no longer using the cable modem (e.g., via input to the RPA engine), such that sending the reboot signal to the cable modem is appropriate.

In this way, the RPA engine component may automatically perform recovery actions to process alarms, which allows the network operations management platform to address a greater volume of alarms in a shorter period of time. This reduces the negative effects of faults in the network and/or client devices by minimizing downtime in the network and/or client devices.

Figure 1C:
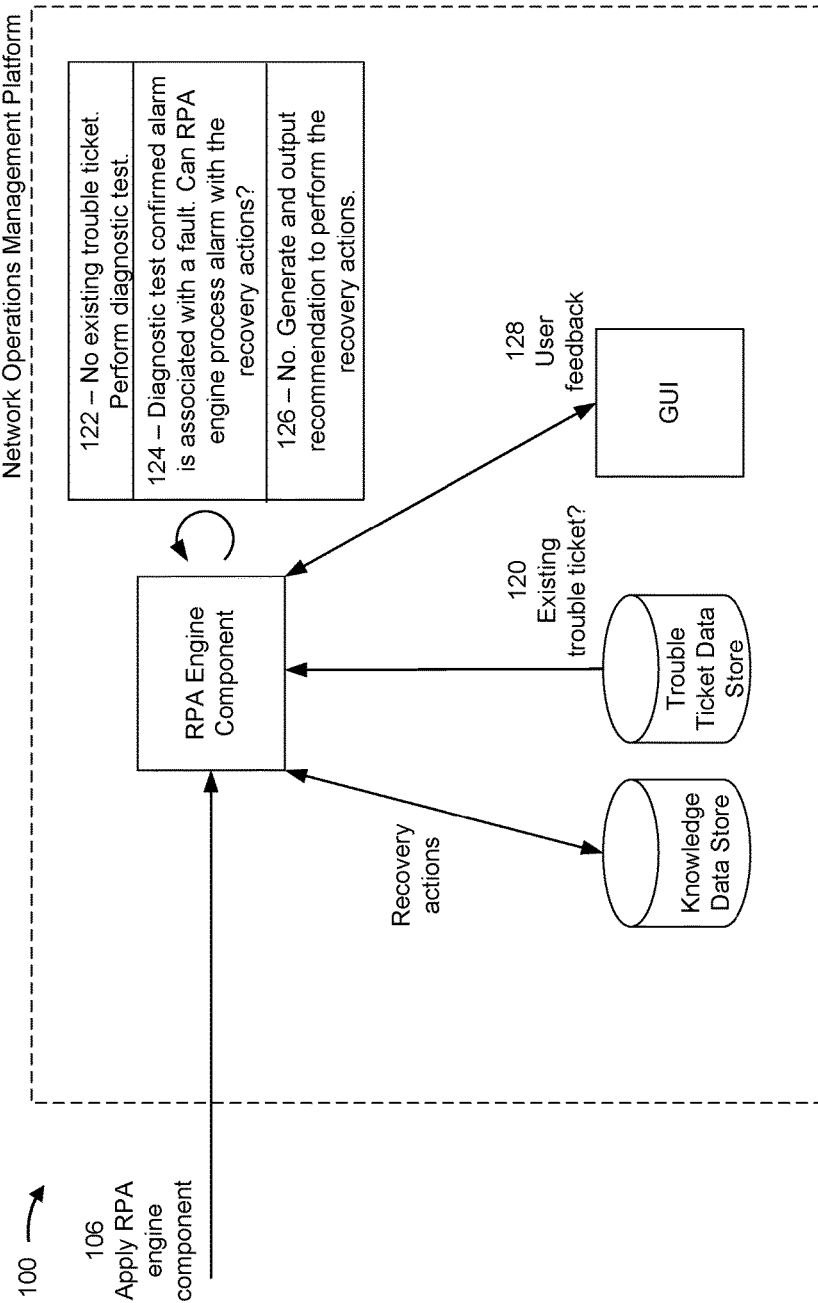

As shown in FIG. 1C, an alarm may be associated with one or more rule-based recovery actions, but the RPA engine component may be unable to process some or all of the rules. As a result, the RPA engine component may automatically generate a trouble ticket for the alarm, enrich the alarm with a detailed description of the one or more rule-based recovery actions to be performed, and provide the trouble ticket to a user to perform the one or more rule-based recovery actions to resolve the alarm. As shown by reference number 120, the RPA engine component may determine if an existing trouble ticket already exists for the alarm in the trouble ticket data store. For example, the RPA engine component may determine if an existing trouble ticket already exists in a manner that is the same as or similar to that described above with respect to reference number 110 of FIG. 1B.

As further shown in FIG. 1C, and as shown by reference number 122, if the RPA engine component determines that there is no existing trouble ticket associated with the alarm, the RPA engine may perform a diagnostic test to confirm that the alarm is associated with a fault in the network, such as any of the faults described herein. For example, the RPA engine may perform a diagnostic test to confirm that the alarm is associated with a fault in the network, in a manner that is the same as or similar to that described above with respect to reference number 112 of FIG. 1B. As shown by reference number 124, if the RPA engine component (e.g., based on the diagnostic test) confirms that the alarm is associated with the fault in the network, the RPA engine component may determine whether the RPA engine component is capable of performing the one or more rule-based recovery actions associated with the alarm.

In some implementations, the RPA engine component may determine that the RPA engine is not capable of performing the one or more rule-based recovery actions for various reasons. For example, the RPA engine component may determine that the RPA engine component is not capable of performing the one or more rule-based recovery actions if an API for performing the one or more rule-based recovery actions does not exist, the one or more rule-based recovery actions involve the use of a GUI, the one or more rule-based recovery actions involve importing information from a network operations system to another network operations system, and/or the like.

As further shown in FIG. 1C, and by reference number 126, if the RPA engine component determines that the RPA engine component is not capable of performing the one or more rule-based recovery actions, the RPA engine component may generate a recommendation to perform the one or more rule-based recovery actions, and output the recommendation. In some implementations, the recommendation may be implemented as a trouble ticket for the alarm, and the RPA engine component may populate the trouble ticket with a description of the alarm, a description of the diagnostic test to perform, the results of the diagnostic test, a description of the one or more rule-based recovery actions, and/or the like. The RPA engine may output the trouble ticket.

In some implementations, the RPA engine component may determine that the RPA engine component is capable of performing some recovery actions, of the one or more rule-based recovery actions, but is not capable of performing other recovery actions of the one or more rule-based recovery actions. For example, the RPA engine component may determine that the RPA engine is capable of performing a first recovery action (e.g., populating one or more text fields in a web-based search system) of the one or more rule-based recovery actions, but that the RPA engine is not capable of performing a second recovery action (e.g., executing the search and analyzing the search results) of the one or more rule-based recovery actions. In this case, the RPA engine component may perform the first recovery action and generate and output a recommendation to perform the second recovery action. In some implementations, the RPA engine component may generate a trouble ticket for the alarm, populate the trouble ticket with a description reflecting that the RPA engine performed the first recovery action and a description of the second recovery action, and output the trouble ticket.

As further shown in FIG. 1C, and by reference number 128, the RPA engine component may generate instructions to display the actions taken by the RPA engine component on the GUI of the network operations management platform, allow the user using the network operations management platform to view the actions being performed by the RPA engine component while the RPA engine component is performing the actions (e.g., in real-time), and allow the user to provide feedback on the actions performed by the RPA engine component in a manner that is the same as or similar to that described above with respect to reference number 118 of FIG. 1B.

Figure 1D:
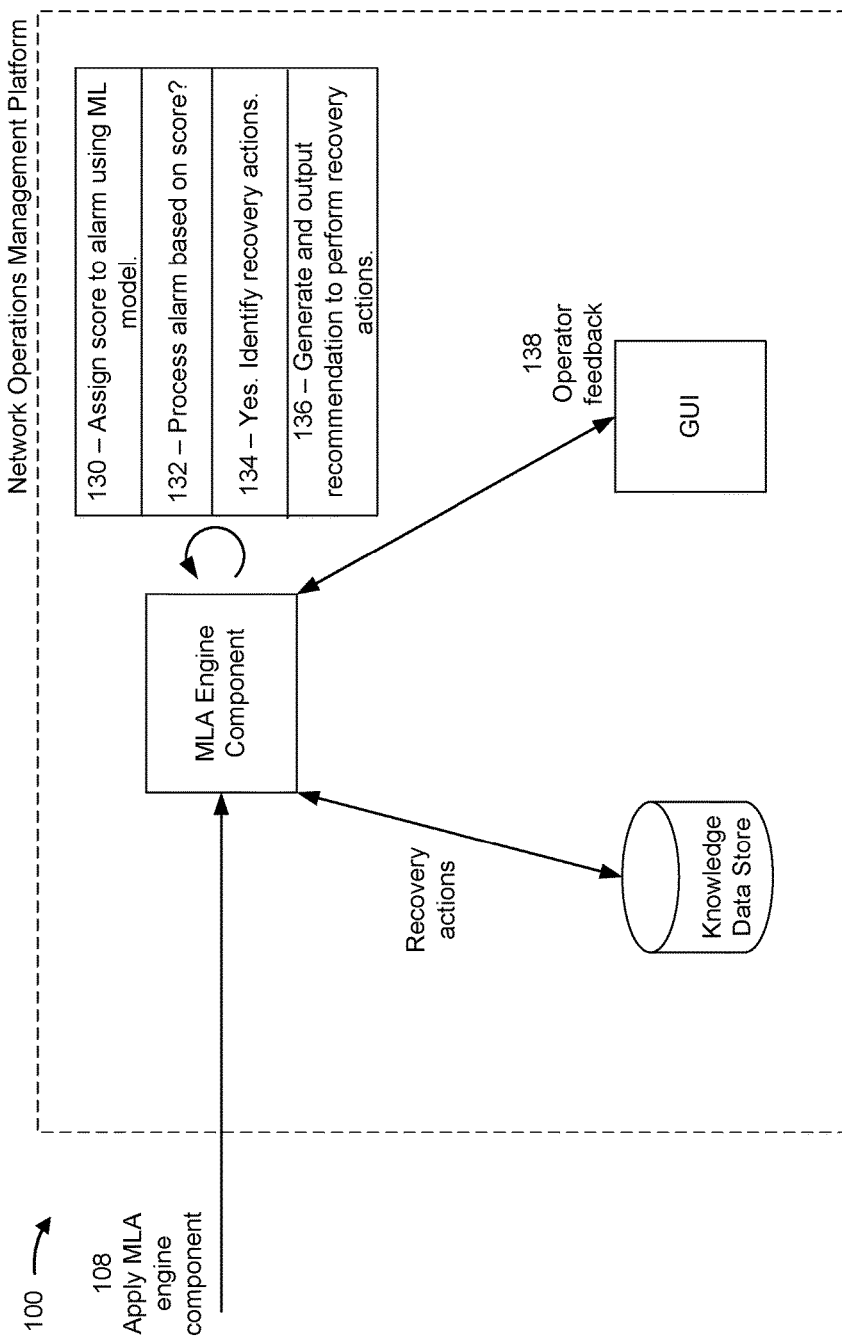

As shown in FIG. 1D, if the analytics engine component selectively causes the alarm to be processed by the MLA engine component (rather than the RPA engine component), the analytics engine component may provide the alarm to the MLA engine component. As shown by reference number 130, the MLA engine component may use a machine learning model to assign a score to the alarm based on historical data associated with the alarm. For example, the machine learning model may be a linear regression model, a logical regression model, and/or the like. In some implementations, the machine learning model may be trained on historical data associated with the alarm. For example, the historical data associated with the alarm may include data associated with the alarm that was collected over a period of time (e.g., a quantity of times the alarm was triggered over the period of time, whether a trouble ticket was generated each time the alarm was triggered over the period of time, whether a recovery action was attempted for the alarm, whether the attempted recovery action was successful, and/or the like). In some implementations, the score assigned by the machine learning model may be a confidence score that represents a probability that the user (e.g., a network operations manager) would open a trouble ticket for the alarm. The score may be implemented in various forms, such as a percentage (e.g., on a scale from 0% to 100%, where 0% indicates an impossibility that the user would open the trouble ticket and 100% indicates a certainty that the user would open the trouble ticket), a number range (e.g., from 0 to 10), and/or the like.

As further shown in FIG. 1D, and by reference number 132, the MLA engine component may determine whether to process the alarm based on the score. In some implementations, the MLA engine component may compare the score for the alarm and a score threshold (e.g., 75% possibility that the user would open the ticket for the alarm, 90% probability, 95% probability, and/or the like). The score threshold may be set by an operator of the network, the user of the network operations management platform, and/or the like. In this case, if the score does not satisfy the score threshold, the MLA engine component may determine to not open a trouble ticket for the alarm.

If the score satisfies the score threshold, the MLA engine component may perform a network diagnostic test to confirm that the alarm is associated with a fault in the network. For example, the MLA engine component may perform a network diagnostic test in a manner that is the same as or similar to that described above with respect to reference number 112 of FIG. 1B. If the MLA engine component (1) determines that the score satisfies the score threshold, and (2) confirms that the alarm is associated with the fault in the network, the RPA engine component may determine to process the alarm.

As further shown in FIG. 1D, and by reference number 134, if the MLA engine component determines to process the alarm, the MLA engine component may identify one or more proposed recovery actions, for processing the alarm, in the knowledge data store. In some implementations, the one or more proposed recovery actions may be recovery actions that users (e.g., network operations managers) have identified as being potential solutions for the alarm, but have not been confirmed to be successful in processing the alarm with high probability. In some implementations, an alarm may have one or more known possible causes, and each recovery action of the one or more proposed recovery actions may address one of the one or more known possible causes.

As further shown in FIG. 1D, and by reference number 136, the MLA engine component may generate and output a recommendation to perform the one or more proposed recovery actions. In some implementations, the MLA engine component may generate a trouble ticket for the alarm, populate the trouble ticket with the recommendation (e.g., a description of the one or more proposed recovery actions), a description of the alarm, a description of the score assigned to the alarm, a description of the diagnostic test performed, a description of the results of the diagnostic test, and/or the like. The MLA engine may output the trouble ticket.

In some implementations, the MLA engine component may determine that the MLA engine component is capable of performing some of the one or more proposed recovery actions. For example, the one or more proposed recovery actions may include a first proposed recovery action and a second proposed recovery action. In this case, the MLA engine component may determine that the MLA engine component is capable of performing a first proposed recovery action, and therefore may attempt to process the alarm by performing the first proposed recovery action.

Continuing with the example above, if the MLA engine component determines that performing the first proposed recovery action successfully processed the alarm (e.g., by performing a diagnostic test), the MLA engine component may generate the trouble ticket for the alarm, populate the trouble ticket with a description of the actions taken by the MLA engine component in processing the alarm as well as a description indicating that the alarm was successfully processed, and close the trouble ticket.

In some implementations, the MLA engine component may determine that the RPA engine component can performing the one or more proposed recovery actions, and may provide instructions to the RPA engine component to permit the RPA engine component to automatically perform the one or more proposed recovery actions.

If the MLA engine component determines that performing the first proposed recovery action did not successfully process the alarm (e.g., by performing a diagnostic test), the MLA engine component may generate the trouble ticket for the alarm, populate the trouble ticket with a description that the MLA engine component performed the first proposed recovery action, a description that the first proposed recovery action did not successfully process the alarm, and a recommendation to perform the second proposed recovery action. The MLA engine component may output the trouble ticket.

As further shown in FIG. 1D, and by reference number 138, the MLA engine component may generate instructions to display the actions taken by the MLA engine component on the GUI of the network operations management platform, allow the user using the network operations management platform to view the actions being performed by the MLA engine component while the MLA engine component is performing the actions (e.g., in real-time), and allow the user to provide feedback on the actions performed by the MLA engine component in a manner that is the same as or similar to that described above with respect to reference number 118 of FIG. 1B. In some implementations, the MLA engine component may use the feedback received from the user to modify the one or more proposed recovery actions and store the modified one or more proposed recovery actions in the knowledge data store. In some implementations, the MLA engine may use the feedback to update the machine learning model. For example, feedback received from the user may indicate that a trouble ticket should not have been generated for the alarm, and the MLA engine may incorporate the feedback into the machine learning model (e.g., by training the machine learning model) so a score assigned to the same or similar alarm in the future will be reduced. In this way, computing resources that would otherwise be used performing recovery actions to process the alarm, generating trouble tickets for the alarm, and/or the like.

Additionally, in situations where the MLA engine component outputs a recommendation for a user to perform the one or more proposed recovery actions, the MLA engine component may monitor the user performing the one or more proposed recovery actions, and may modify the one or more proposed recovery actions based on monitoring the user performing the one or more proposed recovery actions. For example, the MLA engine component may modify an order in which the one or more proposed recovery actions are to be performed. As another example, the MLA engine component may replace a recovery action of the one or more proposed recovery actions with another recovery action based on determining that the recovery action did not help to process the alarm.

Moreover, the MLA engine component may monitor the user performing the one or more proposed recovery actions, and record the recovery actions being performed so that the recovery actions may be automated.

In this way, the MLA engine component can reduce processing and memory utilization of the network operations management platform by ensuring that trouble tickets are automatically opened for alarms having a high probability of becoming a trouble ticket in the future. Moreover, the MLA engine component may use feedback from users to improve the efficacy and efficiency of proposed recovery actions, as well as the accuracy of the machine learning model. In addition, the combination of statistical analysis using the machine learning models with the feedback from users may be used to develop rule-based recovery actions for alarms so that the alarms may eventually be processed automatically by the RPA engine component.

Figure 1E:
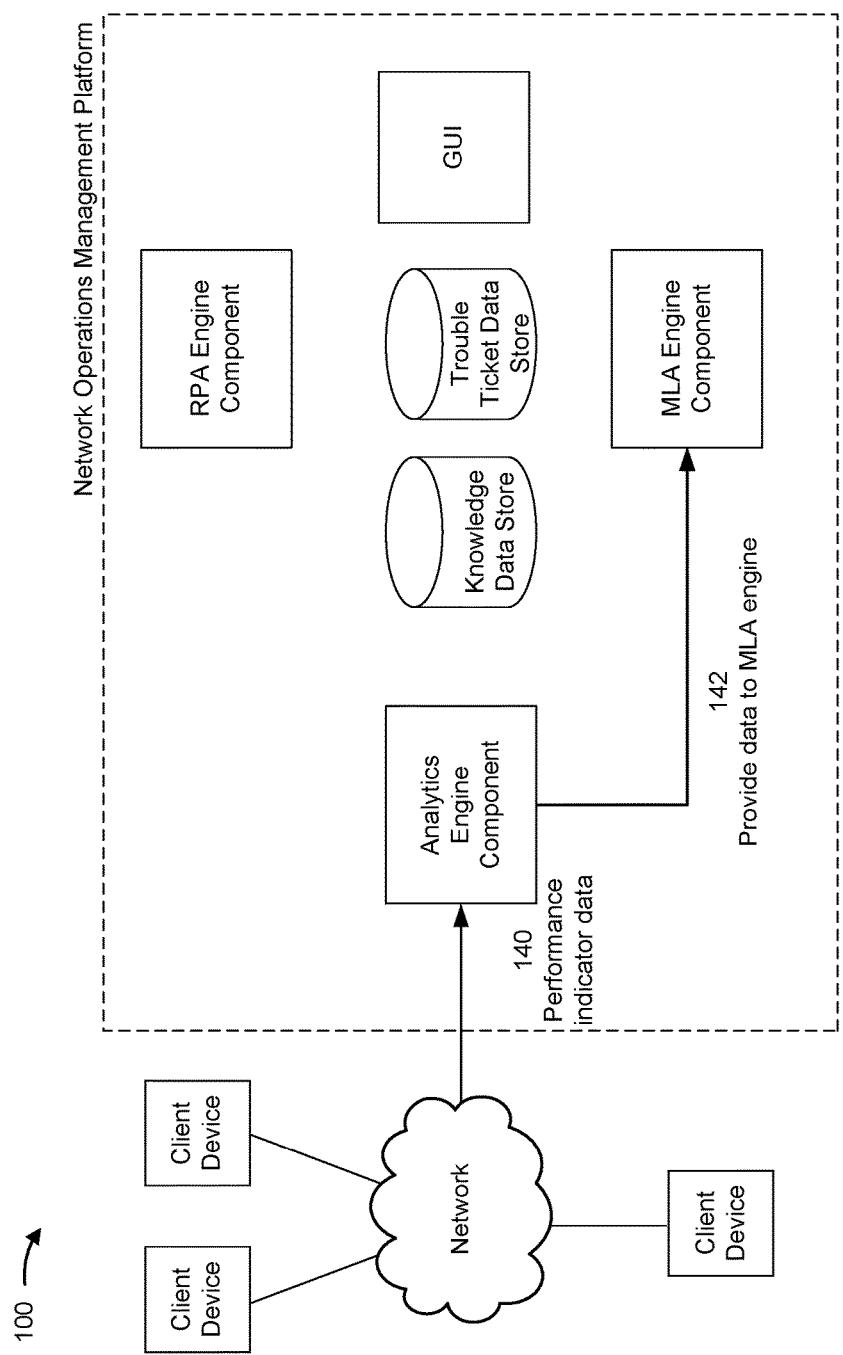

As shown in FIG. 1E, in some implementations, the network operations management platform may perform a recovery action and/or generate trouble tickets in the absence of an alarm for a fault in the network. As shown by reference number 140, the network operations management platform may be monitoring a performance indicator associated with the network, and may receive data associated with the performance indicator from the network. For example, the network operations management platform may be monitoring jitter in the network, may receive data (e.g., ping times) from ping tests in the network, and may use the variation of ping times from the ping tests to monitor the jitter in the network. As shown by reference number 142, the analytics engine component may provide the data associated with the performance indicator to the MLA engine component so that the MLA engine component may process the data. In some implementations, the analytics engine component may provide the data associated with the performance indicator to the RPA engine component (rather than the MLA engine component) to permit the RPA engine component to automatically take an action to address the performance indicator.

Figure 1F:
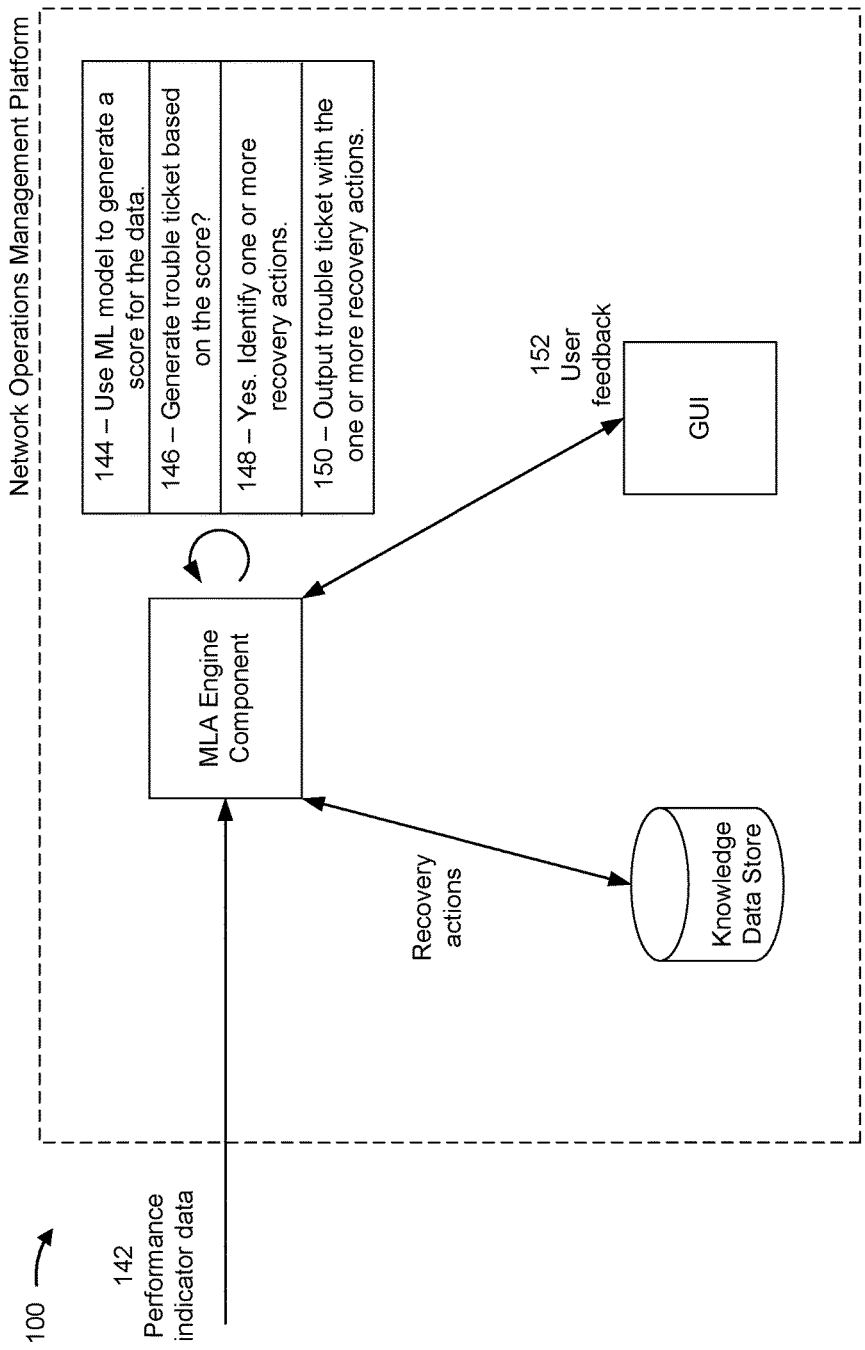

As shown in FIG. 1F, and by reference number 144, the MLA engine component may receive and process the data associated with the performance indicator. For example, to process the data associated with the performance indicator, the MLA may use a machine learning model to generate a score for the data associated with the network performance data. In some implementations, the machine learning model may be a linear regression model, a logical regression model, and/or the like. The machine learning model may have been trained on historical data for the performance indicator. The historical data for the performance indicator may include data associated with the performance indicator that was collected over a time period, and whether a trouble ticket was generated during the time period for the performance indicator.

In some implementations, the score may define a probability that a fault associated with the performance indicator will occur in the network. For example, the score may be high (e.g., 80% probability, 90% probability, 95% probability, and/or the like) if the data associated with the performance indicator reflects a degradation in the performance indicator that previously caused a fault in the network. As an example, the score may not yet satisfy a threshold for the performance indicator, but the data associated with the performance indicator may show the performance indicator trending toward the threshold for the performance indicator, and the same or similar trend triggered a network fault as indicated in the historical data, associated with the performance indicator, used to train the machine learning model.

As further shown in FIG. 1F, and by reference number 146, the MLA engine component may determine whether to generate a trouble ticket based on the score. For example, the MLA engine component may compare the score for the performance indicator and a score threshold (e.g., 75% probability, 80% probability, 95% probability, and/or the like). In some implementations, the score threshold may be set by an operator of the network, a user of the network operations management platform, and/or the like. If the score does not satisfy the score threshold, the MLA engine component may determine to not open a trouble ticket for the performance indicator. If the score satisfies the score threshold, the MLA engine component may perform a network diagnostic test to confirm that there is a degradation in the performance indicator. For example, the MLA engine component may perform a diagnostic test to confirm that network latency in the network has degraded.

As further shown in FIG. 1F, and by reference number 148, if the MLA engine component determines to generate a trouble ticket, the MLA engine component may identify one or more recovery actions. For example, the MLA engine component may search the knowledge data store for recovery actions associated with the performance indicator. In this case, the recovery actions associated with the performance indicator may be used to improve the performance indicator and prevent the fault from occurring in the network.

As shown by reference number 150, the MLA engine component may generate and output the trouble ticket. The trouble ticket may include a description of the performance indicator, a description of the diagnostic test performed, a description of the degradation in the performance indicator, a description of the one or more recovery actions to be performed, and/or the like. The MLA engine component my output the trouble ticket.

As shown by reference number 152, the MLA engine component may generate instructions to display the actions taken by the MLA engine component on the GUI of the network operations management platform, allow the user using the network operations management platform to view the actions being performed by the MLA engine component while the MLA engine component is performing the actions (e.g., in real-time), and allow the user to provide feedback on the actions performed by the MLA engine component in a manner that is the same as or similar to that described above with respect to reference number 118 of FIG. 1B.

In some implementations, the MLA engine component may use the feedback received from the user to modify the one or more recovery actions and store the modified one or more recovery actions in the knowledge data store. Moreover, the user can provide feedback indicating whether the one or more recovery actions improved the performance indicator. In this way, the MLA engine component may monitor trends in performance indicators so that recovery actions can be performed to prevent faults from occurring in the network. This improves network reliability and availability. In some implementations, the MLA engine may use the feedback to update the machine learning model. For example, feedback received from the user may indicate that a trouble ticket should not have been generated for the data associated with the performance indicator, and the MLA engine may incorporate the feedback into the machine learning model (e.g., by training the machine learning model) so a score assigned to the performance indicator in the future will be reduced if similar data for the performance indicator is received.

As indicated above, FIGS. 1A-1F are provided merely as examples. Other examples are possible and may differ from what was described with regard to FIGS. 1A-1F.

Figure 2:
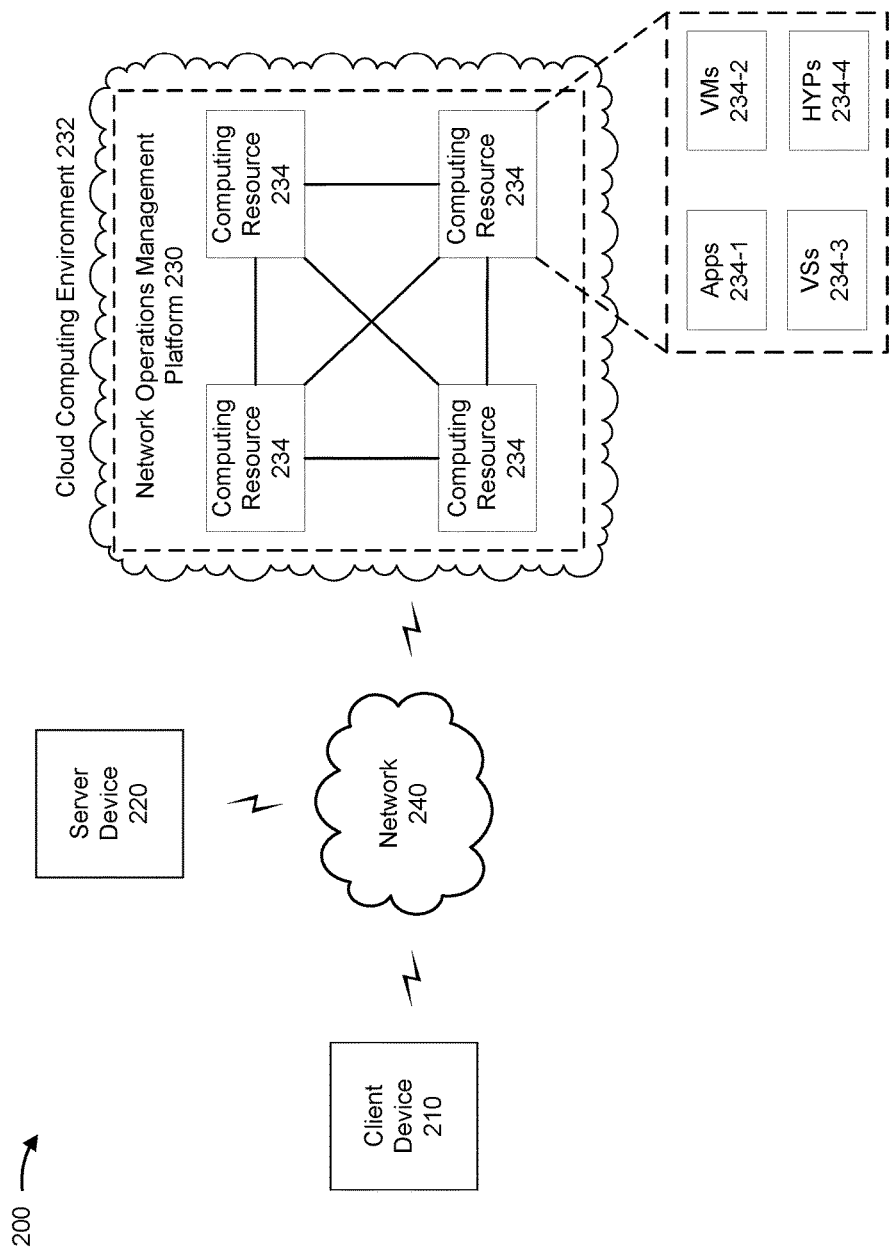
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a server device 220, a network operations management platform 230 in a cloud computing environment 232 that includes a set of computing resources 234, and a network 240. Devices of environment 200 may interconnect via wired connections, wireless connections, or a combination of wired and wireless connections.

Client device 210 includes one or more devices capable of receiving, generating, storing, processing, and/or providing information. For example, client device 210 may include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a desktop computer, or a similar type of device. In some implementations, client device 210 may include a CPE, such as a router, a network switch, a broadband modem (e.g., cable modem, digital subscriber line modem, mobile broadband modem, etc.), a residential gateway, a wireless access point, a set-top box, and/or the like.

Server device 220 includes one or more devices capable of receiving, generating storing, processing, and/or providing information associated with client device 210 and/or network operations management platform 230. In some implementations, server device 220 may include a server (e.g., in a data center or a cloud computing environment), a data center (e.g., a multi-server micro datacenter), a workstation computer, a virtual machine (VM) provided in a cloud computing environment, or a similar type of device. In some implementations, server device 220 may include a communication interface that allows server device 220 to receive information from and/or transmit information to other devices in environment 200. In some implementations, server device 220 may be a physical device implemented within a housing, such as a chassis. In some implementations, server device 220 may be a virtual device implemented by one or more computer devices of a cloud computing environment or a data center.

Network operations management platform 230 includes one or more devices capable of receiving, generating, storing, processing, and/or providing information associated with client device 210, server device 220, and/or network 240. For example, network operations management platform 230 may monitor network 240, and the devices connected thereto (e.g., client device 210, server device 220, and/or the like), and may receive alarms and/or data associated with network performance indicators, as described elsewhere herein. As another example, network operations management platform 230 may perform one or more actions based on the monitoring of network 240 and/or the devices connected thereto (e.g., client device 210, server device 220, and/or the like), such as performing one or more recovery actions to process alarms, perform one or more recovery actions based on data associated with a performance indicator associated with the network, generate trouble tickets, and/or the like.

In some implementations, as shown, network operations management platform 230 may be hosted in cloud computing environment 232. Notably, while implementations described herein describe network operations management platform 230 as being hosted in cloud computing environment 232, in some implementations, network operations management platform 230 may not be cloud-based (i.e., may be implemented outside of a cloud computing environment) or may be partially cloud-based.

Cloud computing environment 232 includes an environment that hosts network operations management platform 230. Cloud computing environment 232 may provide computation, software, data access, storage, and/or other services. As shown, cloud computing environment 232 may include a group of computing resources 234 (referred to collectively as "computing resources 234" and individually as "computing resource 234").

Computing resource 234 includes one or more personal computers, workstation computers, server devices, or another type of computation and/or communication device. In some implementations, computing resource 234 may host network operations management platform 230. The cloud resources may include compute instances executing in computing resource 234, storage devices provided in computing resource 234, data transfer devices provided by computing resource 234, etc. In some implementations, computing resource 234 may communicate with other computing resources 234 via wired connections, wireless connections, or a combination of wired and wireless connections.

As further shown in FIG. 2, computing resource 234 may include a group of cloud resources, such as one or more applications ("APPs") 234-1, one or more virtual machines ("VMs") 234-2, one or more virtualized storages ("VSs") 234-3, or one or more hypervisors ("HYPs") 234-4.

Application 234-1 includes one or more software applications that may be provided to or accessed by one or more devices of environment 200. Application 234-1 may eliminate a need to install and execute the software applications on devices of environment 200. For example, application 234-1 may include software associated with network operations management platform 230 and/or any other software capable of being provided via cloud computing environment 232. In some implementations, one application 234-1 may send/receive information to/from one or more other applications 234-1, via virtual machine 234-2. In some implementations, application 234-1 may include a software application associated with one or more databases and/or operating systems. For example, application 234-1 may include an enterprise application, a functional application, an analytics application, and/or the like.

Virtual machine 234-2 includes a software implementation of a machine (e.g., a computer) that executes programs like a physical machine. Virtual machine 234-2 may be either a system virtual machine or a process virtual machine, depending upon use and degree of correspondence to any real machine by virtual machine 234-2. A system virtual machine may provide a complete system platform that supports execution of a complete operating system ("OS"). A process virtual machine may execute a single program, and may support a single process. In some implementations, virtual machine 234-2 may execute on behalf of a user (e.g., a user of client device 210), and may manage infrastructure of cloud computing environment 232, such as data management, synchronization, or long-duration data transfers.

Virtualized storage 234-3 includes one or more storage systems and/or one or more devices that use virtualization techniques within the storage systems or devices of computing resource 234. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 234-4 provides hardware virtualization techniques that allow multiple operating systems (e.g., "guest operating systems") to execute concurrently on a host computer, such as computing resource 234. Hypervisor 234-4 may present a virtual operating platform to the guest operating systems, and may manage the execution of the guest operating systems. Multiple instances of a variety of operating systems may share virtualized hardware resources.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
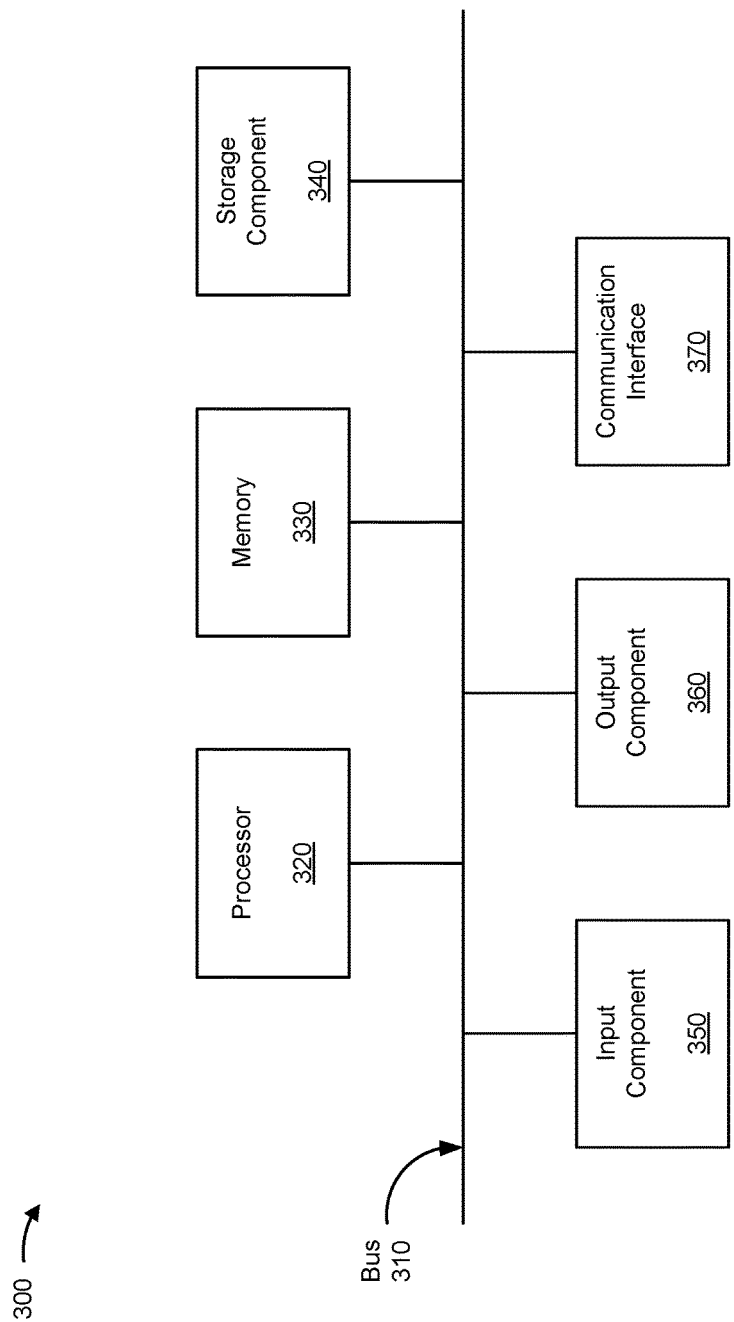
FIG. 3 is a diagram of example components of one or more devices of FIG. 2.

FIG. 3 is a diagram of example components of a device 300. Device 300 may correspond to client device 210, server device 220, network operations management platform 230, and/or computing resource 234. In some implementations, client device 210, server device 220, network operations management platform 230, and/or computing resource 234 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
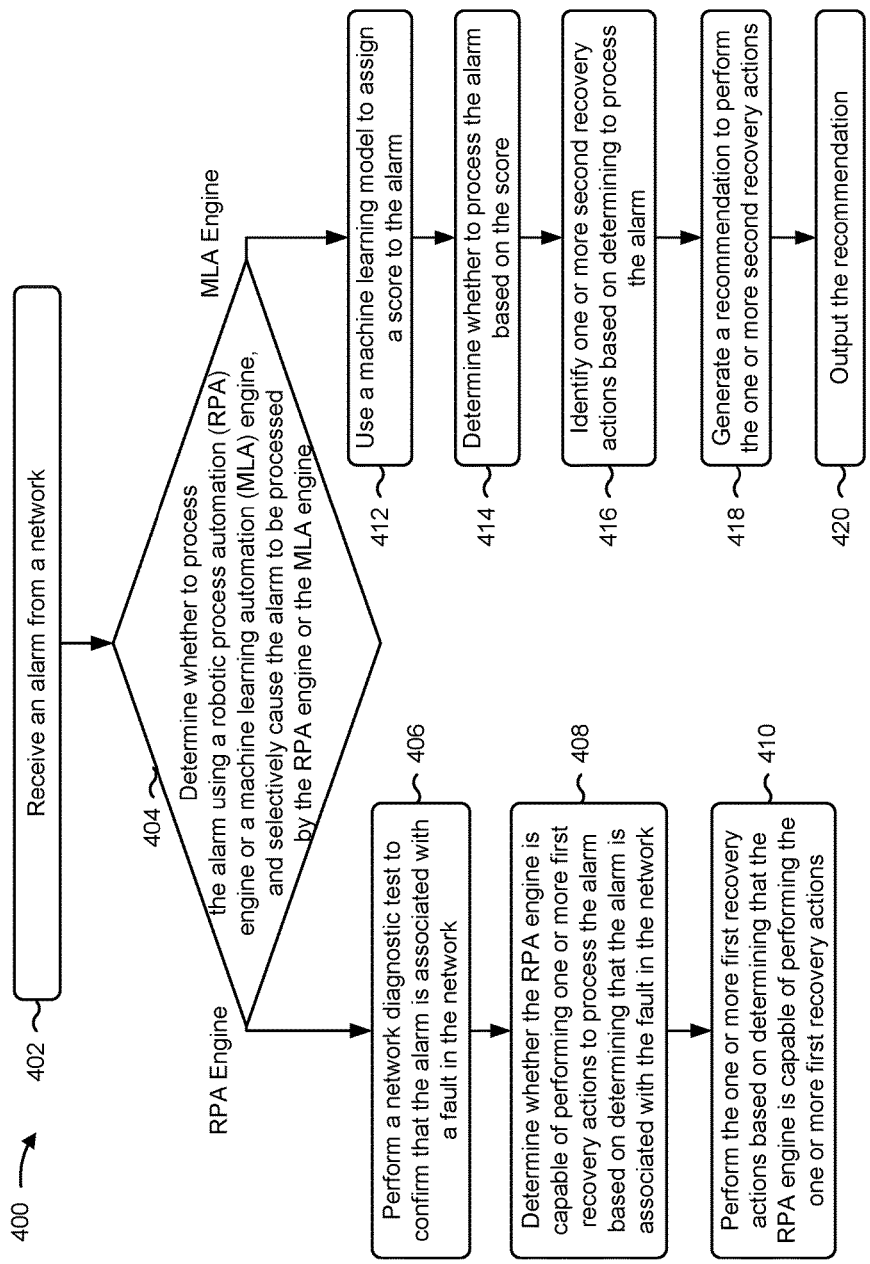
FIG. 4 is a flow chart of an example process for network, service, and customer experience management.

FIG. 4 is a flow chart of an example process 400 for network, service, and customer experience management. In some implementations, one or more process blocks of FIG. 4 may be performed by a network operations management platform (e.g., network operations management platform 230). In some implementations, one or more process blocks of FIG. 4 may be performed by another device or a group of devices separate from or including network operations management platform 230, such as client device 210 and/or server device 220.

As shown in FIG. 4, process 400 may include receiving an alarm from a network (block 402). For example, network operations management platform 230 (e.g., using computing resource 234, processor 320, memory 330, storage component 340, communication interface 370, and/or the like) may receive an alarm from a network, as described above in connection with FIGS. 1A-1F.

As further shown in FIG. 4, process 400 may include determining whether to process the alarm using a RPA engine or a MLA engine, and selectively causing the alarm to be processed by the RPA engine or the MLA engine (block 404). For example, network operations management platform 230 (e.g., using computing resource 234, processor 320, memory 330, storage component 340, communication interface 370, and/or the like) may determine whether to process the alarm using a RPA engine or a MLA engine, and selectively cause the alarm to be processed by the RPA engine or the MLA engine, as described above in connection with FIGS. 1A-1F.

As further shown in FIG. 4, if the alarm is caused to be processed by the RPA engine, process 400 may include performing a network diagnostic test to confirm that the alarm is associated with a fault in the network (block 406). For example, network operations management platform 230 (e.g., using computing resource 234, processor 320, memory 330, storage component 340, communication interface 370, and/or the like) may perform a network diagnostic test to confirm that the alarm is associated with a fault in the network, as described above in connection with FIGS. 1A-1F.

As further shown in FIG. 4, if the alarm is caused to be processed by the RPA engine, process 400 may include determining whether the RPA engine is capable of performing one or more first recovery actions to process the alarm based on determining that the alarm is associated with the fault in the network (block 408). For example, network operations management platform 230 (e.g., using computing resource 234, processor 320, memory 330, storage component 340, communication interface 370, and/or the like) may determine whether the RPA engine is capable of performing one or more first recovery actions to process the alarm based on determining that the alarm is associated with the fault in the network, as described above in connection with FIGS. 1A-1F.

As further shown in FIG. 4, if the alarm is caused to be processed by the RPA engine, process 400 may include performing the one or more first recovery actions based on determining that the RPA engine is capable of performing the one or more first recovery actions (block 410). For example, network operations management platform 230 (e.g., using computing resource 234, processor 320, memory 330, storage component 340, communication interface 370, and/or the like) may perform the one or more first recovery actions based on determining that the RPA engine is capable of performing the one or more first recovery actions, as described above in connection with FIGS. 1A-1F.

As further shown in FIG. 4, if the alarm is caused to be processed by the MLA engine, process 400 may include using a machine learning model to assign a score to the alarm (block 412). For example, network operations management platform 230 (e.g., using computing resource 234, processor 320, memory 330, storage component 340, communication interface 370, and/or the like) may use a machine learning model to assign a score to the alarm, as described above in connection with FIGS. 1A-1F.

As further shown in FIG. 4, if the alarm is caused to be processed by the MLA engine, process 400 may include determining whether to process the alarm based on the score (block 414). For example, network operations management platform 230 (e.g., using computing resource 234, processor 320, memory 330, storage component 340, communication interface 370, and/or the like) may determine whether to process the alarm based on the score, as described above in connection with FIGS. 1A-1F.

As further shown in FIG. 4, if the alarm is caused to be processed by the MLA engine, process 400 may include identifying one or more second recovery actions based on determining to process the alarm (block 416). For example, network operations management platform 230 (e.g., using computing resource 234, processor 320, memory 330, storage component 340, communication interface 370, and/or the like) may identify one or more second recovery actions based on determining to process the alarm, as described above in connection with FIGS. 1A-1F.

As further shown in FIG. 4, if the alarm is caused to be processed by the MLA engine, process 400 may include generating a recommendation to perform the one or more second recovery actions (block 418). For example, network operations management platform 230 (e.g., using computing resource 234, processor 320, memory 330, storage component 340, communication interface 370, and/or the like) may generate a recommendation to perform the one or more second recovery actions, as described above in connection with FIGS. 1A-1F.

As further shown in FIG. 4, if the alarm is caused to be processed by the MLA engine, process 400 may include outputting the recommendation (block 420). For example, network operations management platform 230 (e.g., using computing resource 234, processor 320, memory 330, storage component 340, output component 360, communication interface 370, and/or the like) may output the recommendation, as described above in connection with FIGS. 1A-1F.

Process 400 can include additional implementations, such as any single implementation or any combination of implementations described below and/or described with regard to any other process described herein.

In some implementations, process 400 may include, after outputting the recommendation, monitoring a user performing the one or more second recovery actions, and modifying the one or more second recovery actions based on monitoring the user performing the one or more second recovery actions, modifying the machine learning model based on monitoring the user performing the one or more second recovery actions, or generating one or more rule-based recovery actions for use by the RPA engine to process the alarm.

In some implementations, after outputting the recommendation, the MLA engine may generate instructions to display, on a display of the device, a history of one or more actions performed by the MLA engine, generate instructions to display, on the display of the device, performance statistics for the machine learning model, request input from a user based on the one or more actions performed by the MLA engine and the performance statistics for the machine learning model, and modify at least one of the one or more actions performed by the MLA engine or the machine learning model.

In some implementations, if the alarm is caused to be processed by the RPA engine, process 400 may include generating instructions to display, on a display of a device, the one or more first recovery actions being performed by the RPA engine, request input from a user based on the RPA engine performing the one or more first recovery actions, and update the one or more first recovery actions based on input received from the user.

In some implementations, using the machine learning model to assign the score to the alarm may include using the machine learning model to assign the score to the alarm based on historical data associated with the alarm, and the historical data including at least one of a quantity of times the alarm was triggered over a period of time or a quantity of time a trouble ticket was opened for the alarm over a period of time.

In some implementations, if the alarm is caused to be processed by the RPA engine, process 400 may include generating a second recommendation to perform the one or more first recovery actions based on determining that the RPA engine is not capable of performing the one or more first recovery actions, and outputting the second recommendation.

In some implementations, if the alarm is caused to be processed by the RPA engine, process 400 may include determining that the RPA engine is capable of performing a first recovery action of the one or more first recovery actions, performing the first recovery action based on determining that the RPA engine is capable of performing the first recovery action, generating a second recommendation to perform a second recovery action of the one or more first recovery actions, and outputting the second recommendation.

In some implementations, process 400 may include, after outputting the recommendation, receiving feedback from a user after outputting the second recommendation, and updating the machine learning model based on the feedback. The feedback may be based on whether the alarm was processed successfully using the one or more second recovery actions.

In some implementations, determining whether to process the alarm using the RPA engine or the MLA engine may include determining to process the alarm using the RPA engine when the alarm is associated with one or more rule-based recovery actions to process the alarm.

In some implementations, performing the network diagnostic test may include invoking an API, and performing the network diagnostic test using a diagnostic tool via the invoked API.

In some implementations, the fault in the network may be at least one of a call drop event or a cable modem offline event.

In some implementations, determining that the RPA engine is not capable of performing the one or more first recovery actions may include determining that the RPA is not capable of performing the one or more first recovery actions when the one or more first recovery actions involve using a graphical user interface.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
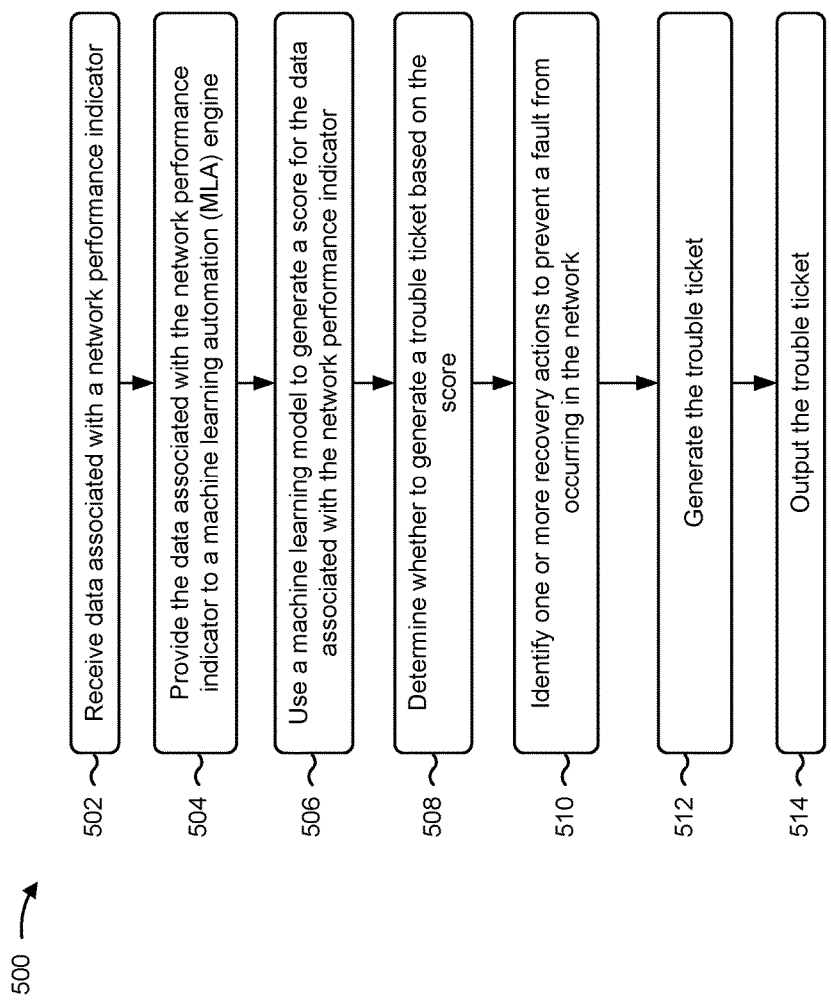
FIG. 5 is a flow chart of an example process for network, service, and customer experience management.

FIG. 5 is a flow chart of an example process 500 for network, service, and customer experience management. In some implementations, one or more process blocks of FIG. 5 may be performed by a network operations management platform (e.g., network operations management platform 230). In some implementations, one or more process blocks of FIG. 5 may be performed by another device or a group of devices separate from or including network operations management platform 230, such as client device 210 and/or server device 220.

As shown in FIG. 5, process 500 may include receiving data associated with a network performance indicator (block 502). For example, network operations management platform 230 (e.g., using computing resource 234, processor 320, memory 330, storage component 340, communication interface 370, and/or the like) may receive data associated with a network performance indicator, as described above in connection with FIGS. 1A-1F.

As further shown in FIG. 5, process 500 may include providing the data associated with the network performance indicator to a MLA engine (block 504). For example, network operations management platform 230 (e.g., using computing resource 234, processor 320, memory 330, storage component 340, communication interface 370, and/or the like) may provide the data associated with the network performance indicator to a MLA engine, as described above in connection with FIGS. 1A-1F.

As further shown in FIG. 5, process 500 may include using a machine learning model to generate a score for the data associated with the network performance indicator (block 506). For example, network operations management platform 230 (e.g., using computing resource 234, processor 320, memory 330, storage component 340, communication interface 370, and/or the like) may use a machine learning model to generate a score for the data associated with the network performance indicator, as described above in connection with FIGS. 1A-1F. In some implementations, the score may define a probability of a fault, associated with the performance indicator, occurring in a network.

As further shown in FIG. 5, process 500 may include determining whether to generate a trouble ticket based on the score (block 508). For example, network operations management platform 230 (e.g., using computing resource 234, processor 320, memory 330, storage component 340, communication interface 370, and/or the like) may determine whether to generate a trouble ticket based on the score, as described above in connection with FIGS. 1A-1F.

As further shown in FIG. 5, process 500 may include identifying, based on determining to generate the trouble ticket, one or more recovery actions to prevent the fault from occurring in the network (block 510). For example, network operations management platform 230 (e.g., using computing resource 234, processor 320, memory 330, storage component 340, communication interface 370, and/or the like) may identify, based on determining to generate the trouble ticket, one or more recovery actions to prevent the fault from occurring in the network, as described above in connection with FIGS. 1A-1F.

As further shown in FIG. 5, process 500 may include generating the trouble ticket (block 512). For example, network operations management platform 230 (e.g., using computing resource 234, processor 320, memory 330, storage component 340, communication interface 370, and/or the like) may generate the trouble ticket, as described above in connection with FIGS. 1A-1F. In some implementations, the trouble ticket may include a description of the one or more recovery actions.

As further shown in FIG. 5, process 500 may include outputting the trouble ticket (block 514). For example, network operations management platform 230 (e.g., using computing resource 234, processor 320, memory 330, storage component 340, output component 360, communication interface 370, and/or the like) may output the trouble ticket, as described above in connection with FIGS. 1A-1F.

Process 500 can include additional implementations, such as any single implementation or any combination of implementations described below and/or described with regard to any other process described herein.

In some implementations, the network performance indicator includes at least one of network latency of a network, bandwidth usage of one or more CPEs connected to the network, throughput of the network, a quantity of active users using the network, jitter in the network, packet loss in the network, a service indicator associated with a service, or a customer experience indicator associated with a customer experience.

In some implementations, determining whether to generate the trouble ticket may include performing a network diagnostic test to confirm a degradation in the performance indicator, and determining to generate the trouble ticket based on the network diagnostic test confirming the degradation in the performance indicator.

In some implementations, the network diagnostic test may include at least one of a network bandwidth test, a network latency test, a packet loss test, a ping test, a traceroute test, or a domain name service lookup test.

In some implementations, process 500 may include receiving, after dispatching the trouble ticket, feedback from a user on the trouble ticket through a graphical user interface, and storing the feedback in a knowledge data store. In some implementations, the feedback may modify at least one of the one or more recovery actions.

In some implementations, the machine learning model is trained on historical data associated with the performance indicator.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A network operations management platform, comprising:
   a robotic process automation (RPA) engine component;
   a machine learning automation (MLA) engine component;
   one or more memories; and
   one or more processors, communicatively coupled to the one or more memories, to:
      receive an alarm from a network;
      determine, based on whether the alarm is associated with one or more rule-based recovery actions, whether to process the alarm using the RPA engine component of the network operations management platform or the MLA engine component of the network operations management platform; and
      selectively cause the alarm to be processed by the RPA engine component or the MLA engine component, the RPA engine component to:
         perform a network diagnostic test to confirm that the alarm is associated with a fault in the network, determine whether the RPA engine component is capable of performing one or more first recovery actions to process the alarm based on determining that the alarm is associated with the fault in the network, and
perform the one or more first recovery actions based on determining that the RPA engine component is capable of performing the one or more first recovery actions, or
the MLA engine component to:
use a machine learning model to assign a score to the alarm,
determine whether to process the alarm based on the score,
identify one or more second recovery actions based on determining to process the alarm,
generate a recommendation to perform the one or more second recovery actions, and
output the recommendation.

2. The network operations management platform of claim 1, wherein the MLA engine component, after outputting the recommendation, is further to:
monitor a user performing the one or more second recovery actions; and
at least one of:
modify the one or more second recovery actions based on monitoring the user performing the one or more second recovery actions,
modify the machine learning model based on monitoring the user performing the one or more second recovery actions, or
generate one or more rule-based recovery actions for use by the RPA engine component to process the alarm.

3. The network operations management platform of claim 1, wherein the MLA engine component, after outputting the recommendation, is further to:
generate instructions to display, on a display of a device, a history of one or more actions performed by the MLA engine component;
generate instructions to display, on the display of the device, performance statistics for the machine learning model;
request input from a user based on the one or more actions performed by the MLA engine component and the performance statistics for the machine learning model; and
modify, based on the input, at least one of the one or more actions performed by the MLA engine component or the machine learning model.

4. The network operations management platform of claim 1, wherein the RPA engine component, when performing the one or more first recovery actions, is to:
generate instructions to display, on a display of associated with the network operations management platform, the one or more first recovery actions being performed by the RPA engine component;
request input from a user based on the RPA engine component performing the one or more first recovery actions; and
update the one or more first recovery actions based on input received from the user.

5. The network operations management platform of claim 1, wherein the MLA engine component, when using the machine learning model to assign the score to the alarm, is to:

use the machine learning model to assign the score to the alarm based on historical data associated with the alarm,
the historical data including at least a quantity of times the alarm was triggered over a period of time.

6. The network operations management platform of claim 1, wherein the recommendation is a first recommendation, and the RPA engine component is to:
generate a second recommendation to perform the one or more first recovery actions based on determining that the RPA engine component is not capable of performing the one or more first recovery actions, and
output the second recommendation.

7. The network operations management platform of claim 1, wherein the recommendation is a first recommendation, and the RPA engine component is to:
determine that the RPA engine component is capable of performing a first recovery action of the one or more first recovery actions;
perform the first recovery action based on determining that the RPA engine component is capable of performing the first recovery action;
generate a second recommendation to perform a second recovery action of the one or more first recovery actions; and
output the second recommendation.

8. A non-transitory computer-readable medium storing instructions, the instructions comprising:
one or more instructions that, when executed by one or more processors, cause the one or more processors to:
receive an alarm from a network;
determine, based on whether the alarm is associated with one or more rule-based recovery actions, whether to process the alarm using a robotic process automation (RPA) engine or a machine learning automation (MLA) engine,
the RPA engine and MLA engine being associated with the one or more processors;
selectively cause the alarm to be processed by the RPA engine or the MLA engine,
the RPA engine to:
perform a network diagnostic test to confirm that the alarm is associated with a fault in the network,
determine whether the RPA engine is capable of performing one or more first recovery actions to process the alarm based on determining that the alarm is associated with the fault in the network,
generate a first recommendation to perform the one or more first recovery actions based on determining that the RPA engine is not capable of performing the one or more first recovery actions, and
output the first recommendation; or
the MLA engine to:
use a machine learning model to assign a score to the alarm based on historical data associated with the alarm,
determine whether to process the alarm based on the score,
identify one or more second recovery actions based on determining to process the alarm,
generate a second recommendation to perform the one or more second recovery actions, and
output the second recommendation.

9. The non-transitory computer-readable medium of claim 8, wherein the MLA engine, after outputting the second recommendation, is further to:

receive feedback from a user after outputting the second recommendation,
    the feedback based on whether the alarm was processed successfully using the one or more second recovery actions; and
update the machine learning model based on the feedback.

10. The non-transitory computer-readable medium of claim 8, wherein the one or more instructions, that cause the one or more processors to determine whether to process the alarm using the RPA engine or the MLA engine, cause the one or more processors to:
    determine to process the alarm using the RPA engine when the alarm is associated with the one or more rule-based recovery actions to process the alarm.

11. The non-transitory computer-readable medium of claim 8, wherein the RPA engine, when performing the network diagnostic test, is to:
    invoke an application programming interface (API); and
    perform the network diagnostic test using a diagnostic tool via the invoked API.

12. The non-transitory computer-readable medium of claim 8, wherein the historical data associated with the alarm includes a quantity of times a trouble ticket was opened for the alarm over a period of time.

13. The non-transitory computer-readable medium of claim 8, wherein the fault in the network is at least one of a call drop event or a cable modem offline event.

14. The non-transitory computer-readable medium of claim 8, wherein the RPA engine, when determining whether the RPA engine is capable of performing the one or more first recovery actions, is to:
    determine that the RPA is not capable of performing the one or more first recovery actions when the one or more first recovery actions involve using a graphical user interface.

15. A method, comprising:
    receiving, at a device, data associated with a network performance indicator;
    determining, by the device, that the network performance indicator is not associated with one or more rule-based recovery actions associated with a robotic process automation (RPA) engine associated with the device;
    providing, by the device and based on determining that the network performance indicator is not associated with one or more rule-based recovery actions associated with the RPA engine, the data associated with the network performance indicator to a machine learning automation (MLA) engine associated with the device;
    using, by the MLA engine, a machine learning model to generate a score for the data associated with the network performance indicator,
        wherein the score defines a probability of a fault, associated with the network performance indicator, occurring in a network;
    determining, by the MLA engine, whether to generate a trouble ticket based on the score;
    identifying, by the MLA engine and based on determining to generate the trouble ticket, one or more recovery actions to prevent the fault from occurring in the network;
    generating, by the MLA engine, the trouble ticket,
        wherein the trouble ticket includes a description of the one or more recovery actions; and
    outputting, by the MLA engine, the trouble ticket.

16. The method of claim 15, wherein the network performance indicator includes at least one of network latency of a network, bandwidth usage of one or more customer-premises equipments (CPEs) connected to the network, throughput of the network, a quantity of active users using the network, jitter in the network, packet loss in the network, a service indicator associated with a service, or a customer experience indicator associated with a customer experience.

17. The method of claim 15, wherein determining whether to generate the trouble ticket comprises:
    performing a network diagnostic test to confirm a degradation in the network performance indicator; and
    determining to generate the trouble ticket based on the network diagnostic test confirming the degradation in the network performance indicator.

18. The method of claim 17, wherein the network diagnostic test includes at least one of a network bandwidth test, a network latency test, a packet loss test, a ping test, a traceroute test, or a domain name service lookup test.

19. The method of claim 15, further comprising:
    after outputting the trouble ticket:
        receiving, from a user, feedback on the trouble ticket through a graphical user interface,
            wherein the feedback modifies at least one of the one or more recovery actions, and
        storing the feedback in a knowledge data store.

20. The method of claim 15, wherein the machine learning model is trained on historical data associated with the network performance indicator.

* * * * *